(12) United States Patent
Hahn

(10) Patent No.: US 8,186,397 B2
(45) Date of Patent: May 29, 2012

(54) HARDWOOD TEXTURING APPARATUS AND METHODS FOR USING SAME

(75) Inventor: Kris Edward Hahn, Big Canoe, GA (US)

(73) Assignee: Columbia Insurance Company, Omaha, NE (US)

( * ) Notice: Subject to any disclaimer, the term of this patent is extended or adjusted under 35 U.S.C. 154(b) by 117 days.

(21) Appl. No.: 12/463,818

(22) Filed: May 11, 2009

(65) Prior Publication Data
US 2009/0277537 A1    Nov. 12, 2009

Related U.S. Application Data

(60) Provisional application No. 61/051,932, filed on May 9, 2008.

(51) Int. Cl.
*B27C 1/00*     (2006.01)
(52) U.S. Cl. .................................. 144/114.1; 144/117.1
(58) Field of Classification Search ............... 144/114.1, 144/117.1, 122, 129, 2.1, 136.1
See application file for complete search history.

(56) References Cited

U.S. PATENT DOCUMENTS

| | | | |
|---|---|---|---|
| 694,386 A | 3/1901 | Johnston | |
| 1,364,244 A | 1/1921 | Camm | |
| 1,609,889 A | 12/1926 | Serman | |
| 1,738,966 A | 12/1929 | Ruttiman et al. | |
| 1,800,338 A | 4/1931 | Chapman | |
| 2,617,223 A * | 11/1952 | Davidson et al. | 29/76.1 |
| 2,695,043 A | 11/1954 | Shauer et al. | |
| 3,247,047 A | 4/1966 | Buckley | |
| 3,474,706 A | 10/1969 | Wheeler | |
| 3,495,638 A | 2/1970 | Humphrey | |
| 3,605,534 A | 9/1971 | Barr | |
| 3,614,968 A | 10/1971 | Hirz | |
| 3,703,198 A | 11/1972 | Luebs | |
| 3,756,295 A | 9/1973 | Halop | |
| 3,863,530 A | 2/1975 | Weidman | |
| 3,875,835 A | 4/1975 | Roberts | |
| 3,913,642 A | 10/1975 | Porter | |
| 3,941,018 A | 3/1976 | Williams | |
| 4,263,947 A * | 4/1981 | Steiling | 144/3.1 |
| 4,558,725 A | 12/1985 | Veneziale | |
| 4,712,596 A | 12/1987 | McClaran | |
| 4,776,376 A | 10/1988 | Jaeger | |
| 4,844,134 A | 7/1989 | Martindalle | |
| 4,917,159 A | 4/1990 | Martin | |
| 4,945,959 A | 8/1990 | Biedenbach | |
| 4,949,768 A | 8/1990 | Giles et al. | |
| 5,024,131 A | 6/1991 | Weidman | |
| 5,058,641 A | 10/1991 | Giles | |
| 5,271,699 A | 12/1993 | Barre et al. | |
| 5,318,083 A | 6/1994 | Gonner et al. | |
| 5,417,262 A | 5/1995 | Gonner | |
| 5,649,578 A | 7/1997 | Leguin | |
| 5,987,217 A | 11/1999 | Wisniewski et al. | |
| 6,041,836 A | 3/2000 | Murai | |
| 6,289,953 B1 | 9/2001 | Hasegawa | |

(Continued)

*Primary Examiner* — Shelley Self
(74) *Attorney, Agent, or Firm* — Ballard Spahr LLP

(57) ABSTRACT

Texturing apparatuses and methods are provided for forming a textured surface on a panel. An exemplary texturing apparatus has a bed and a mount having at least one cutting blade that can be configured to impart a cut to a top structural surface of the panel as the panel is moved along the bed. The bed is configured to receive the panel and can define one or more openings. The mount is operably positioned in the opening and can be articulated in one or more directions with respect to the plane of the bed.

50 Claims, 10 Drawing Sheets

U.S. PATENT DOCUMENTS

| | | |
|---|---|---|
| 6,330,492 B1 | 12/2001 | Wisniewski et al. |
| 6,371,176 B1 | 4/2002 | Burr et al. |
| 6,418,831 B1 | 7/2002 | Cunningham, Jr. |
| 6,609,546 B1 | 8/2003 | Bobb et al. |
| 6,660,333 B2 | 12/2003 | Frame |
| 6,796,888 B2 | 9/2004 | Jasch |
| 6,896,017 B2 | 5/2005 | Rankin, Sr. |
| 6,978,814 B2 | 12/2005 | van Capelleveen |
| 7,000,658 B1 | 2/2006 | Soukiassian et al. |
| 7,108,031 B1 | 9/2006 | Secrest |
| 2002/0132050 A1 | 9/2002 | Frame |
| 2003/0066574 A1 | 4/2003 | Lovchik et al. |
| 2005/0034785 A1 | 2/2005 | Lovchik et al. |

\* cited by examiner

HARDWOOD TEXTURING APPARATUS AND METHODS FOR USING SAME

This application claims priority to and the benefit of U.S. Provisional Application No. 61/051,932, filed on May 9, 2008, which is incorporated in its entirety in this document by reference

FIELD OF THE INVENTION

This invention relates generally to apparatuses, systems and methods for forming a textured surface on a panel. More particularly, in one aspect the invention relates to apparatuses, systems and methods of using at least one cutting blade to form a textured effect, such as, for example, a hand-scraped effect, on a surface of a panel.

BACKGROUND OF THE INVENTION

For centuries, wood has been the recognized and sought after material of choice for use in flooring of homes and buildings. In centuries past, wooden planks or panels were cut and hewn by hand. However, since the early 1800s, machines have been developed for efficient cutting and planing of machined wood flooring. Unfortunately, the machined flooring lost much of their hand-hewn or individualistic appearance.

In recent decades, the types of wood flooring have expanded to include solid wood flooring, engineered flooring (which is made from several layers of wood and often designed to withstand higher levels of humidity), and laminate flooring (which typically comprises a faux wood image applied to a base of particle board). Typically, the machined or engineered flooring products are produced to have a generally smooth, machine-finished appearance.

There is a growing demand for textured panels having a surface effect that simulates the antique and aged appearance of old beams and planks that were hewn out of logs by hand with an adze or an axe. In order to reproduce the "distressed" or worn appearance of old wood floors, flooring companies have devised ways to artificially distress the planks. Generally, these distressing operations have involved the use of extensive manual labor to produce a random distressed appearance. The manual distressing process is generally accomplished using combinations of hand tools and hand techniques. Many do-it-yourself television shows provide instructions to individuals, demonstrating how to distress wood using techniques such as hitting the wood with hammers, chains, and other hard materials that create dents and cuts of different shapes and sizes. As may be appreciated, such a process can be very time and labor intensive.

Alternatively, machining has been used to attempt to produce a hand-hewn appearance. Typically however, machine distressing of the panels has generally produced a "machined" distressed appearance that has a noticeable or repeated pattern. Thus, there is a need for apparatuses, systems and methods for producing a hand-scraped or distressed appearance to surfaces of flooring panels.

SUMMARY OF THE INVENTION

In accordance with the purposes of this invention, as embodied and broadly described herein, this invention, in one aspect, relates to an apparatus for forming a textured surface on a panel. In one aspect, the apparatus comprises a planar bed configured to receive the panel and allow movement of the panel in a machine direction, the bed defining at least one opening. In a further aspect, the apparatus comprises at least one mount having a top surface and being operably positioned in the at least one opening, and at least one cutting blade fixedly mounted to the at least one mount. A distal portion of the cutting blade can extend outwardly from the top surface of the at least one mount. The apparatus, in a further aspect, comprises means for articulating the at least one mount within the at least one opening in a direction substantially transverse to the machine direction and substantially transverse to the plane of the bed.

In another aspect, the invention relates to an apparatus for forming a textured surface on a panel comprising a planar bed, a plurality of mounts, a plurality of cutting blades and means for moving each of the plurality of mounts. In one aspect, the planar bed is configured to receive the panel and allow movement of the panel in a machine direction and defines a plurality of openings arranged in an array. In a further aspect, the plurality of mounts each have a respective top surface and at least one of the plurality of mounts is positioned therein each of the openings. At least one of the cutting blades, in one aspect, is mounted to each of the mounts and a respective distal portion of each of the cutting blades extends outwardly from the top surface of the respective mount. In a further aspect, the means for moving each of the mounts within each of the respective openings is configured to move the mounts in a first direction substantially transverse to the machine direction and substantially transverse to the plane of the bed and a second direction that is substantially transverse to the machine direction and substantially parallel to the plane of the bed.

In yet another aspect, a method is provided for forming a textured surface on a panel. In one aspect, the method comprises providing an apparatus comprising a planar bed defining at least one opening and configured to allow movement of the panel in a machine direction, at least one mount operably positioned therein the at least one opening, and at least one cutting blade fixedly mounted to the at least one mount. In a further aspect, a distal portion of the at least one cutting blade extends outwardly from the top surface of the at least one mount. The method, in a further aspect, comprises moving the at least one mount within the opening in a direction substantially transverse to the machine direction and substantially parallel to the plane of the bed.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

DESCRIPTION OF THE PREFERRED EMBODIMENTS

Aspects of the present invention may be understood more readily by reference to the following detailed description, examples, drawings, claims, and their previous and following description. However, before the present apparatuses, systems, and/or methods are disclosed and described, it is to be understood that this invention is not limited to the specific apparatuses, systems, and/or methods disclosed unless otherwise specified, as such can, of course, vary. It is also to be understood that the terminology used herein is for the purpose of describing particular aspects only and is not intended to be limiting.

As used in the specification and the appended claims, the singular forms "a," "an" and "the" include plural referents unless the context clearly dictates otherwise. Thus, for example, reference to a "cutting blade" can include two or more such cutting blades unless the context indicates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, the terms "optional" or "optionally" means that the subsequently described event or circumstance may or may not occur, and that the description includes instances where said event or circumstance occurs and instances where it does not.

Reference will now be made in detail to aspects of the invention, examples of which are illustrated in the accompanying drawings. Wherever possible, the same reference numbers are used throughout the drawings to refer to the same or like parts.

Figure 1:
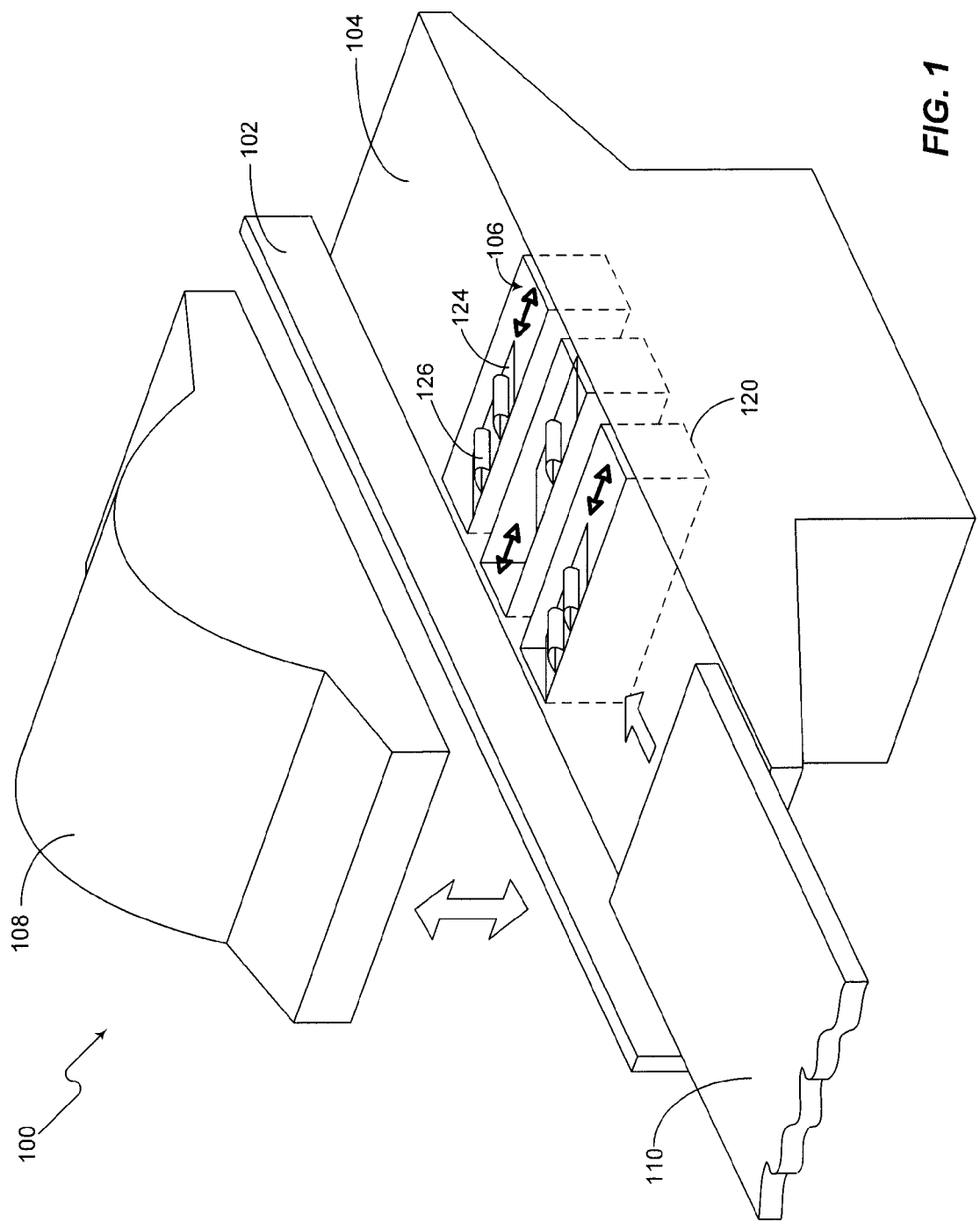
FIG. 1 is a schematic diagram illustrating a texturing apparatus for forming a textured surface on a panel, according to one aspect.

In one aspect, a texturing apparatus is provided for forming a textured surface on a panel. With reference to FIG. 1, an exemplary texturing apparatus 100 can comprise a planar bed 104 that is configured to receive the panel 110. In operation, the panel generally travels in a machine direction indicated by the arrow at the forward end of the panel. In various aspects, the machine direction is substantially parallel to the longitudinal axis of the planar bed 104. In a further aspect, one or more guides 102 can be provided to guide the panel in the machine direction. For example, a guide can be removably mounted to the bed proximate a longitudinal edge of the bed, as illustrated in FIG. 1. As can be seen, the guide can extend vertically upward in a plane substantially transverse to the plane of the bed and parallel to the longitudinal edge of the bed. The texturing apparatus can also comprise a second guide (not shown) positioned proximate the opposing longitudinal edge of the bed. In one aspect, a guide can be movable between a first position proximate a respective longitudinal edge of the bed, and a second position spaced inwardly from the respective longitudinal edge. In this manner, the guides can be selectively spaced to guide panels having different widths.

In another aspect, the texturing apparatus 100 comprises means for moving a panel along the bed in the machine direction. For example, the texturing apparatus can comprise a power feed roller 108. The power feed roller can be configured to be lowered to make contact with the panel 110 (indicated by the arrow in FIG. 1, for example) and to move the panel at a constant speed or at variable speeds. Optionally, the panel can be manually moved along the bed (such as by pushing the panel at a distal end along the bed), or by other means.

In various aspects, it is contemplated that the panel can comprise one or more materials. In one aspect, the panel comprises wood. In another aspect, the panel comprises a top structural layer formed of wood. In this aspect, the remainder of the panel (i.e., the portion other than the top structural layer) can be formed of wood particles, an engineered material, or other material. It is contemplated that, in one aspect, the panel can be inverted prior to moving the panel along the bed such that at least a portion of the top structural layer substantially contacts the upper surface of the bed.

Figure 2:
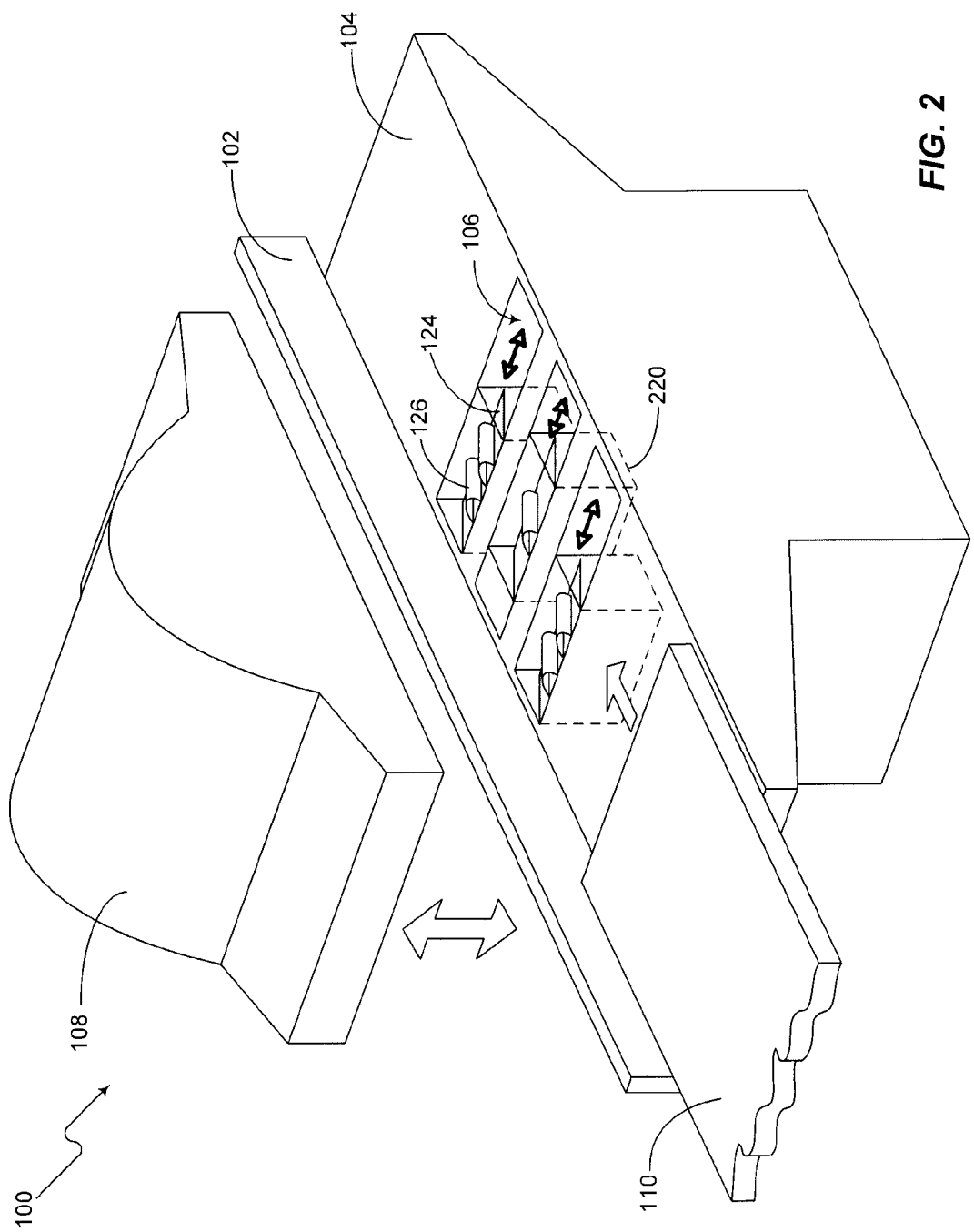
FIG. 2 is a schematic diagram illustrating a texturing apparatus for forming a textured surface on a panel, according to another aspect.

The bed 104, in one aspect, defines at least one opening 106. As can be seen in FIGS. 1 and 2, in one aspect, an opening defined by the bed can extend substantially across the entire width of the bed (i.e., the transverse dimension of the bed). In other aspects, the opening(s) can have a width that is less than the width of the bed. In one aspect, the at least one opening comprises a plurality of openings (e.g., two or more). In this aspect, the openings can all have substantially the same dimensions, or can each have distinct dimensions (i.e., one opening can be wider or longer than another opening). Additionally, the openings 106 in one aspect can form an array. Optionally, the openings can form a random pattern. FIGS. 1 and 2 illustrate beds defining three openings; however, it will be appreciated that it is contemplated that the bed can define any number of openings.

In one aspect, one or more mounts 124 are provided that can be operably positioned in the one or more openings 106 defined by the planar bed. It is contemplated that, in one aspect, if multiple openings are defined by the bed, at least one mount can be operably positioned in each of the openings. Thus, in one aspect, one mount can be positioned in each opening. Optionally, two or more mounts can be positioned in each opening.

In one aspect, a mount 124 can be operably positioned therein an opening 106 of the planar bed 104. For example, at least a portion of the mount can be movably mounted to a portion of an edge defined by the perimeter of the opening, to a lower surface of the bed, to an upper surface of the bed, or to another portion of the texturing apparatus. In another aspect, the edge of the opening can define a lip on which a portion of the mount can be positioned. It is contemplated that the mount can be operably positioned in the opening by various means.

Figure 8:
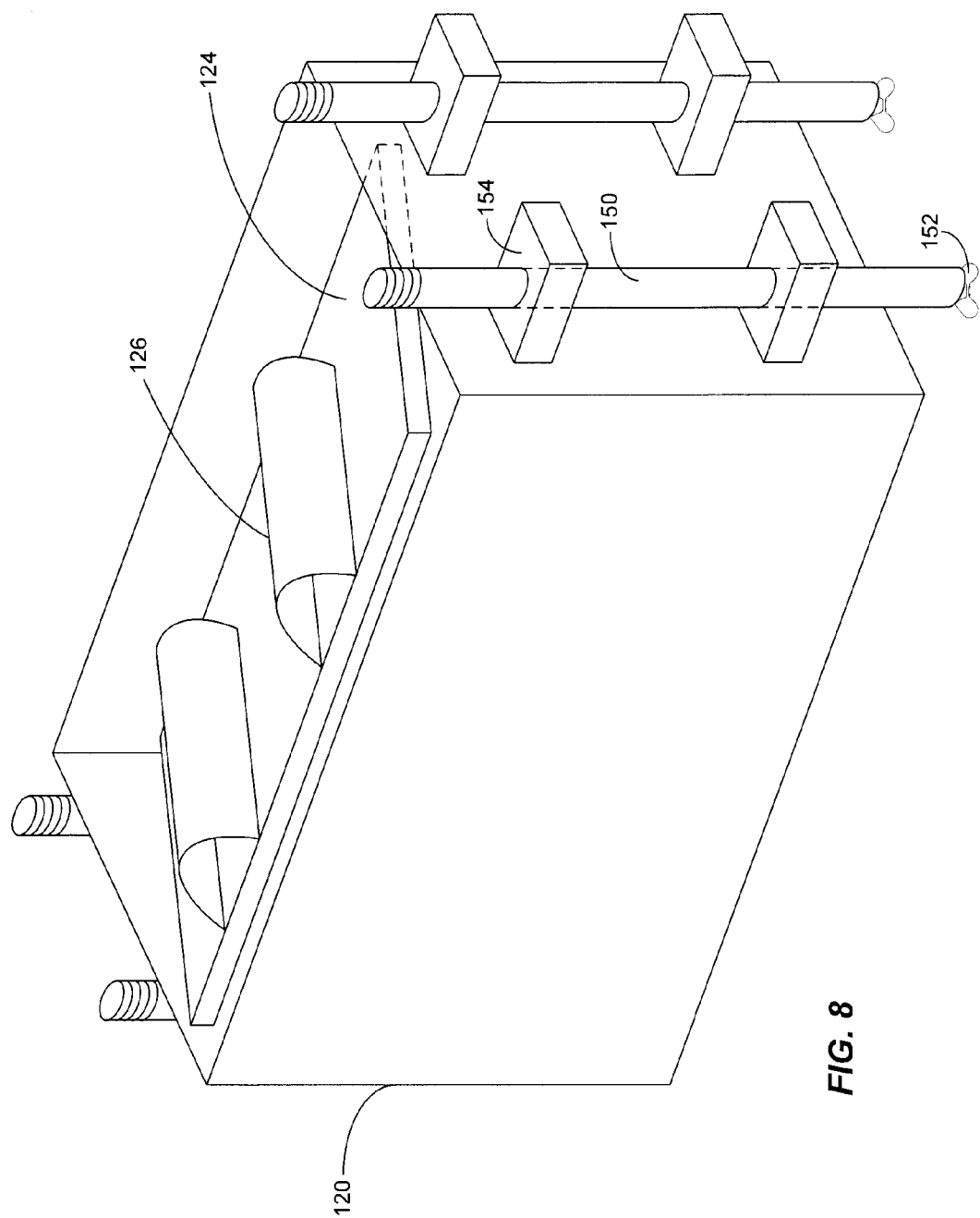
FIG. 8 is a schematic diagram illustrating a housing having fasteners for fastening the housing to a texturing apparatus for forming a textured surface on a panel, according to one aspect.

Optionally, the mount 124 can be positioned within a housing 120. The housing can then be operably positioned in a respective opening. As can be seen in FIG. 1, the housing 120, in one aspect, can have a cross-sectional shape and size that is substantially similar to at least a portion of the shape of a respective opening. In this aspect, the housing can be attached (removably, fixedly or otherwise) directly to the bed by conventional means, such as bolting, clamping, riveting and other known means. For example, with reference to FIG. 8, one or more fastener mounts 154 can be mounted to portions of the housing with fasteners 150 passing therethrough. The fasteners can have threaded distal ends to allow them to be screwed into corresponding threaded apertures in the underside of the bed. Conventional tightening means, such as, for example and without limitation, wing nuts 152, hex nuts, screws, and the like, can be used to assist in tightening or loosening the fasteners.

In another aspect, the shape and/or size of the housing can differ from the shape and/or size of the opening. For example, FIG. 2 illustrates a housing 220 that has a dimension transverse to the machine direction that is less than the transverse dimension of its respective opening 106. In this aspect, the housing can be mountable beneath the surface of the bed (such as, but not limited to, as described above) or within the opening such that it can be moved beneath or within the opening in a direction substantially transverse to the machine direction (as indicated by the arrows in FIG. 2). For instance, the texturing apparatus can comprise tracks positioned beneath the surface of the bed or within the opening on which the housing can be movably mounted.

Figure 3:
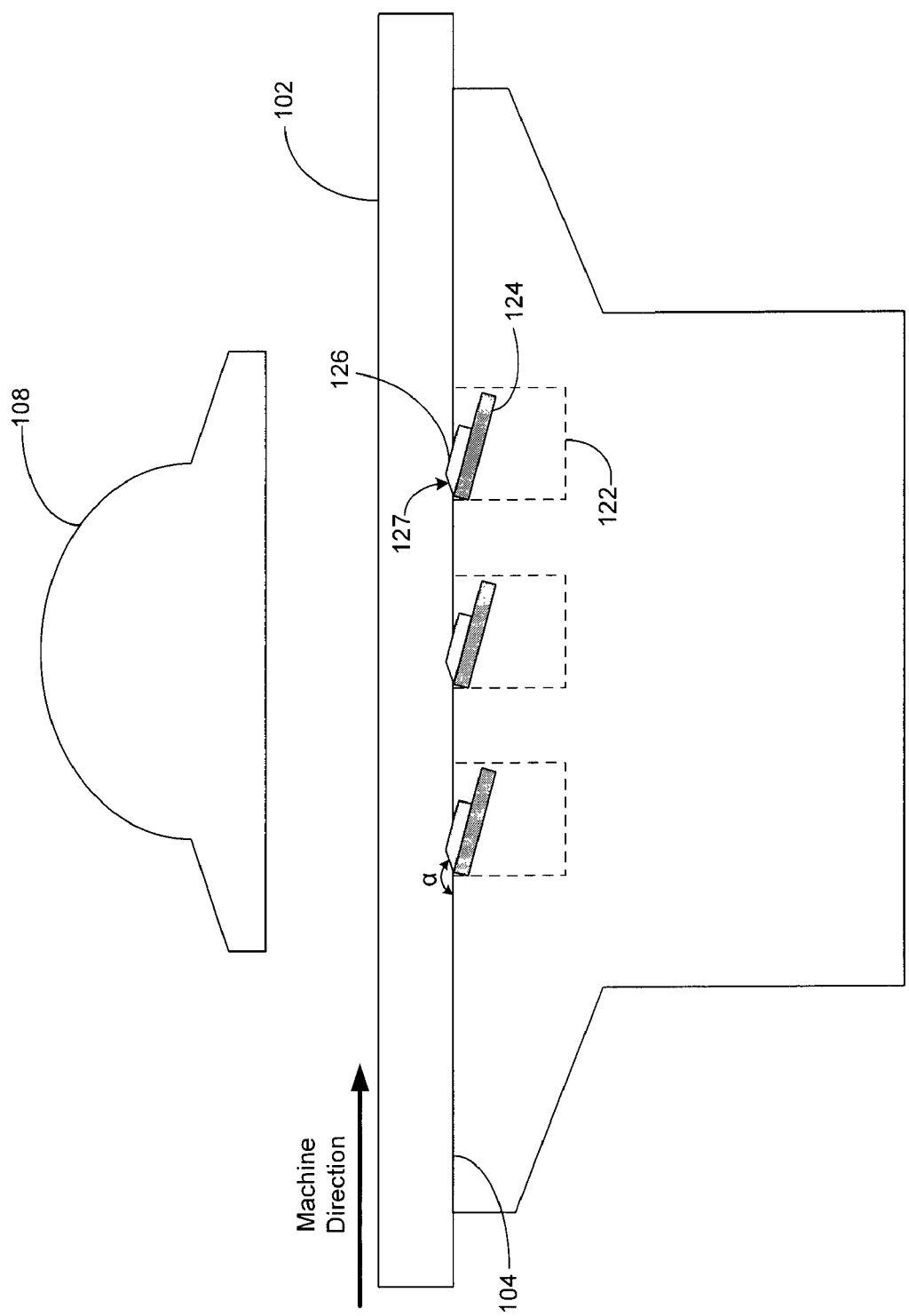
FIG. 3 is a schematic diagram illustrating a side-view of a texturing apparatus for forming a textured surface on a panel, for example as shown in FIG. 1, according to one aspect.

In a further aspect, at least one cutting blade is provided that is fixedly mounted to a top surface of a respective mount, such that at least a portion of the cutting blade extends outwardly from the top surface of the respective mount. For example, FIG. 3 illustrates a side view of a cutting blade 126 extending from the top surface of a respective mount 124. It is contemplated that the cutting blades, as described in various aspects herein, can be of any shape or size. For example, in one particular aspect, a cutting blade can have a non-linear cross section. In another aspect, a cutting blade 126 can have an arcuate cross section, such as illustrated in FIG. 1. Optionally, a cutting blade can have a cross section of any other shape.

In one aspect, a cutting blade can comprise a cutting edge 127 oriented toward or facing the machine direction, as shown in FIG. 3. In this aspect, the cutting edge defines an angle relative to the plane of the bed in the machine direction. As shown in FIG. 3, in one aspect the angle α can be obtuse. In this aspect, it is contemplated that the portion of the cutting edge proximate the planar bed will contact a surface of the panel prior to the portion of the cutting edge distal to the planar bed. In other aspects, the angle can be acute, or a right angle. In various aspects, it is contemplated that the angle can vary in operation of the texturing apparatus. As shown in FIG. 3, in one aspect the cutting edge 127, as viewed from the side, can be substantially linear. Optionally, the cutting edge, as viewed from the side, can be non-linear (such as, but not limited to, arcuate). It is further contemplated that the cutting edge can be arcuate and concave relative to the machine direction. Optionally, the cutting edge can be arcuate and convex relative to the machine direction.

The cutting blade can have various dimensions, according to various aspects. In a particular aspect, the width of a cutting blade 126 taken at a portion proximate the top surface of the mount and perpendicular to the machine direction can range from about 1 mm to about 100 mm. Optionally, the width of the cutting blade can range from about 1 mm to about 75 mm. In another aspect, the width of the cutting blade can range from about 1 mm to about 50 mm, such as 40 mm. Likewise, the height of the cutting blade taken at the distal portion of the cutting blade (i.e., the portion of the cutting blade that first contacts the panel as it moves in the machine direction) relative to the top surface of the mount and perpendicular to the plane of the mount's top surface can range from about 0.1 mm to about 15 mm. Optionally, the height can range from about 0.1 mm to about 7.5 mm. In another aspect, the height can range from about 0.1 mm to about 3 mm, including 0.25 mm, 0.5 mm, 0.75 mm, 1 mm, 1.25 mm, 1.5 mm, 1.75 mm, 2 mm, 2.25 mm, 2.5 mm, 2.75 mm, and 3 mm.

In various aspects, one or more cutting blades 126 can be mounted to a respective mount. In a particular aspect, two or more mounts can be provided, and each mount can have a different number of cutting blades mounted thereto, such as shown in FIG. 1. In one aspect, two or more cutting blades can be mounted to a respective mount. In this aspect, the distance between the cutting blades can range from about 1 mm to about 75 mm. Optionally, the distance can range from about 1 mm to about 50 mm. In yet another aspect, the distance can range from about 25 mm to about 40 mm, including 25 mm, 30 mm, 35 mm, and 40 mm.

Figure 6:
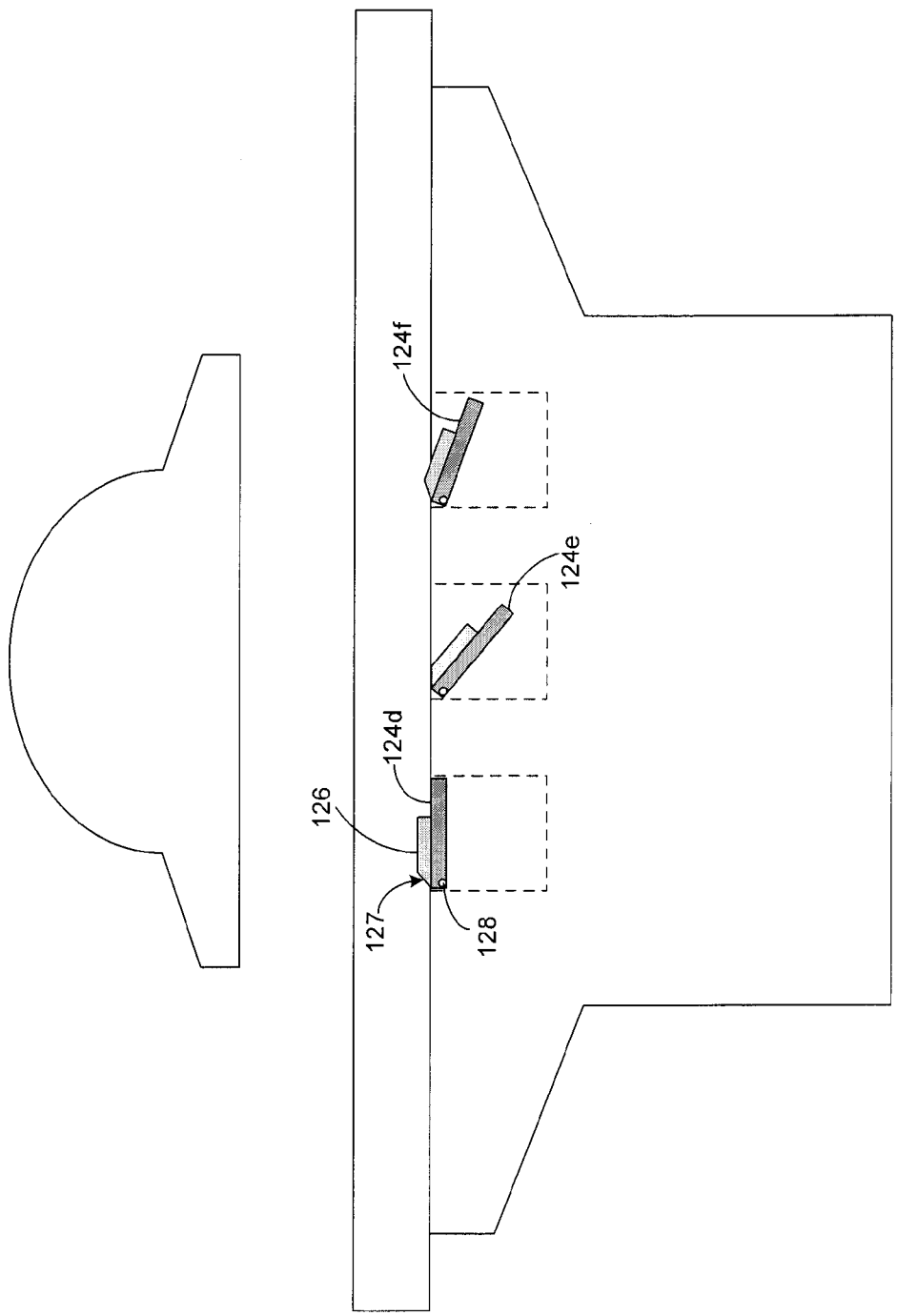
FIG. 6 is a schematic diagram illustrating a side-view of a texturing apparatus for forming a textures surface on a panel, for example as shown in FIG. 1, and further illustrating exemplary movement of mounts, according to yet another aspect.

The texturing apparatus, according to various aspects, can comprise means for articulating a mount within an opening. As described above and as shown, for example, in FIG. 1, in one aspect, the mount 124 is operably positioned directly in the opening 106. In this aspect, the mount can be articulated in a first direction that is substantially transverse to the plane of the bed and substantially transverse to the machine direction. Optionally, the mount can also be articulated in a second direction that is substantially transverse to the machine direction and substantially parallel to the plane of the bed, as illustrated by the arrows in FIG. 1. The mount can be moveable in the second direction through the entire width of the opening, or can be moveable only through a portion of the opening. In a further aspect, the mount can be pivoted around an axis that is substantially transverse to the machine direction and substantially parallel with the plane of the bed, such as shown in FIG. 6.

For clarity and conciseness, as used herein, articulation in a first direction can mean articulation in a direction that is substantially transverse to the plane of the bed and substantially transverse to the machine direction. However, it can also mean articulation relative to a first axis substantially transverse to the plane of the bed and substantially transverse to the machine direction. Similarly, as used herein, articulation in a second direction can mean articulation in a direction that is substantially transverse to the machine direction and substantially parallel to the plane of the bed. However, articulation in a second direction can also mean articulation relative to a second axis substantially transverse to the machine direction and substantially parallel to the plane of the bed.

In various aspects, the mount 124 can be simultaneously articulated or moved in more than one direction. For instance, the mount can be articulated in the first direction while substantially simultaneously being articulated in the second direction. In one exemplary aspect, the mount can be moveable in any or all of these directions by means of a drive cam that is operably coupled to the mount. In other aspects, one or more pneumatic and/or hydraulic cylinders can be operably coupled to the mount and configured to articulate the mount in one or more of these selected exemplified directions. Optionally, one or more motors can be operatively connected to the mount and configured to move the mount in the first and/or second directions and/or to pivot the mount about an axis, as described above.

As described above, in another aspect, the mount can be operably positioned within a respective housing. In one aspect, a housing 220 is provided that has a transverse dimension relative to the machine direction that is less than the transverse width of the corresponding opening, such as shown in FIG. 2. In this aspect, the housing can be articulated in a second direction that is substantially transverse to the machine direction and substantially parallel to the plane of the bed. In another aspect, a housing 120 is provided that has a transverse dimension relative to the machine direction that is substantially the same as the transverse width of the corresponding opening. In this particular aspect, the mount 124 can be articulated within the housing in a second direction that is substantially transverse to the machine direction and substantially parallel to the plane of the bed. In either aspect, the mount can be articulated within the housing in a first direction that is substantially perpendicular to the plane of the bed.

As can be appreciated, the distance through which the mount and/or housing are articulated in the second direction can vary. In one aspect, the mount can be articulated through a distance of about 0.1 mm to about 50 mm. Optionally, the distance can range from about 0.1 mm to about 25 mm. In another aspect, the distance can range from about 0.1 mm to about 20 mm, including, without limitation, 1 mm, 2.5 mm, 5 mm, 7.5 mm, 10 mm, 12.5 mm, 15 mm, 17.5 mm, and 20 mm.

For example, FIG. 3 illustrates a side view of a texturing apparatus, in which each mount 124 is positioned such that a distal portion of the cutting blade extends upwardly beyond the plane of the bed, such as at a maximum height. It is contemplated that, in one aspect, the maximum height is reached when at least a portion of the top surface of the mount (such as, but not limited to, an edge facing the machine direction) is substantially in the same plane as the plane of the top surface of the bed. The mount can then be articulated in a substantially vertical direction to a position at which the height of the distal portion of the cutting blade relative to the plane of the bed is less than the maximum height. As one skilled in the art will appreciate, in one aspect, by articulating the mount in a substantially vertical direction, the depth of a cut made to a panel by the cutting blade can be varied.

In a particular aspect, the mount can be positioned such that the plane defined by the top surface of the mount is substantially parallel to the plane of the bed. Optionally, the mount can be positioned such that a plane defined by the top surface of the mount defines an angle other than 0° relative to the plane of the bed, such as shown in FIG. 3. Further, the cutting blade can be shaped such that an opening or passage is defined therebetween the surface of the cutting blade and the top surface of the mount. As can be appreciated, as the panel is moved in the machine direction along the bed, the mount and the cutting blade can be selectively moved to contact the panel and make a cut therein a top structural layer of the panel to cut through a portion of a thickness of the panel, resulting in particles or shavings of the panel material being sheared off of the panel. In this particular aspect, as the cutting blade cuts a portion of the panel, any particles or shavings can fall through the opening between the cutting blade and mount. The particles can fall into a waste receptacle or other receptacle for later removal. In other aspects, other means can be provided for removing particles from the texturing apparatus as a panel is cut. For example, an aperture can be defined therethrough a mount, such as below a portion of the cutting blade, such that the particles or shavings can fall through the aperture as the panel is cut.

Figure 4:
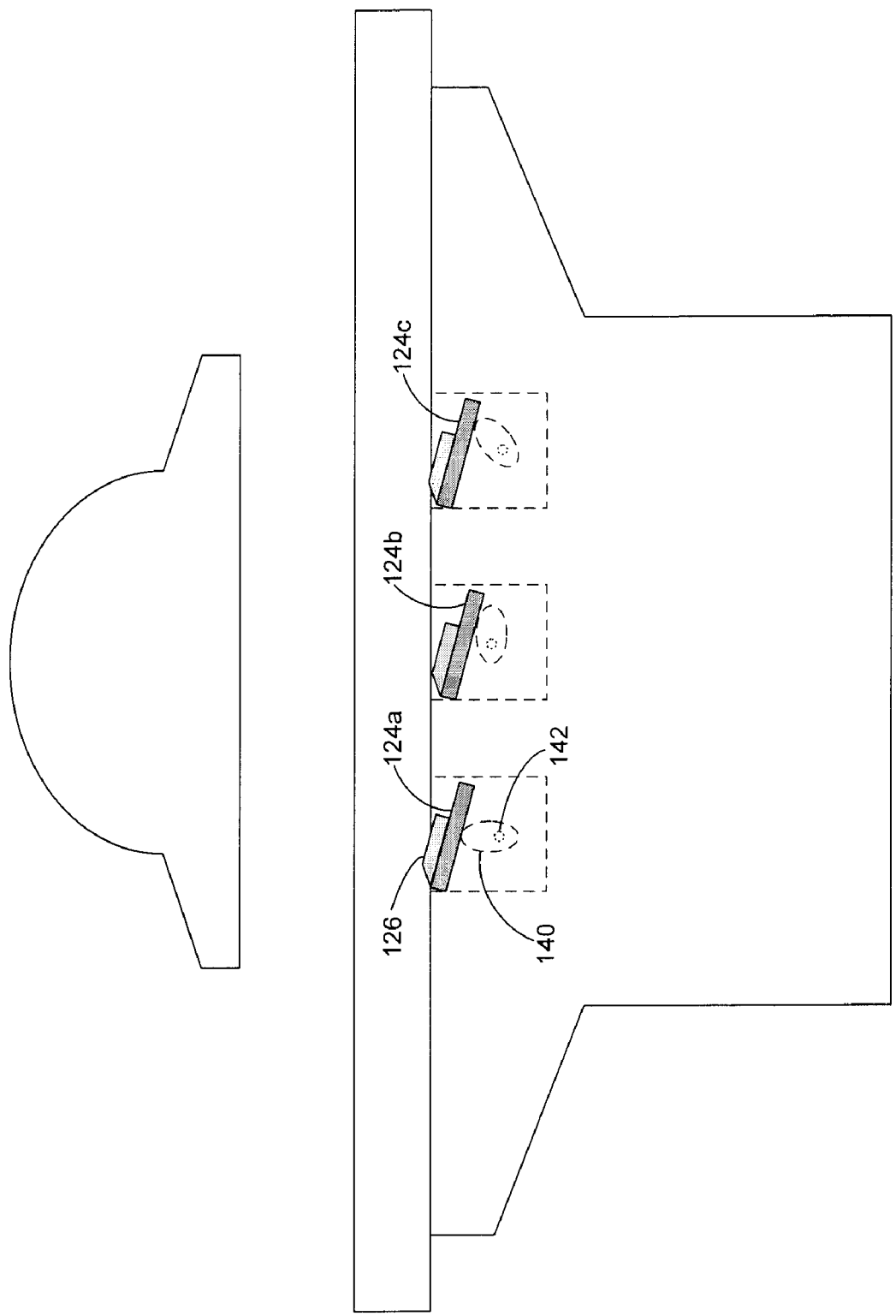
FIG. 4 is a schematic diagram illustrating a side-view of a texturing apparatus for forming a textured surface on a panel, for example as shown in FIG. 1, and further illustrating exemplary movement of mounts, according to yet another aspect.
Figure 5:
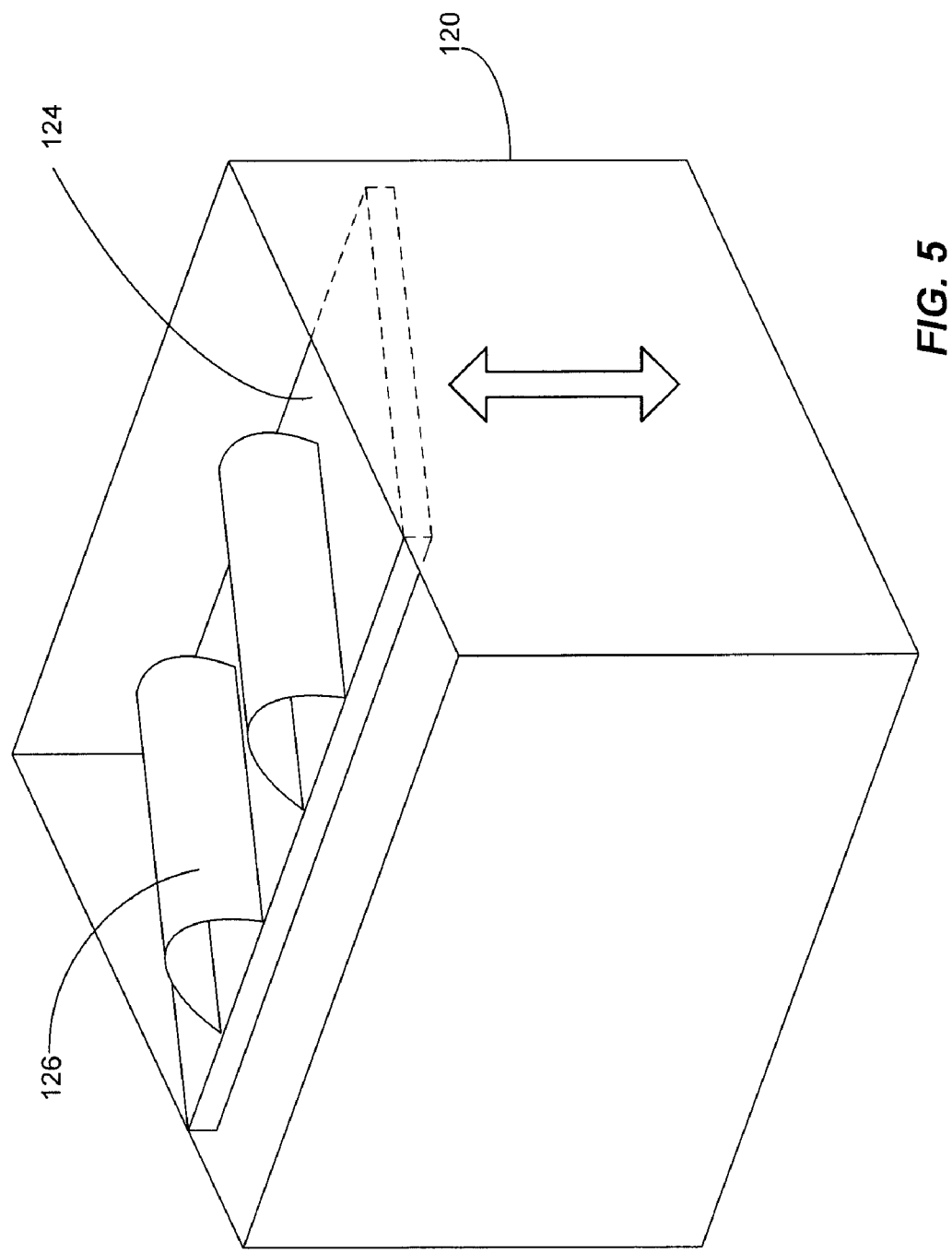
FIG. 5 is a schematic diagram illustrating a housing and movement of a mount within the housing, according to one aspect.

FIG. 4 illustrates several possible positions to which a mount can be articulated in a substantially vertical direction, according to various aspects. For example, the mount can be articulated to a first position at which the cutting blade extends beyond the plane of the bed at a maximum height, as represented by mount 124a. Optionally, the mount can also be articulated to a second position at which a distal portion of the cutting blade is less than the maximum height, as represented by mount 124c. In one aspect, the second position can be a position at which a distal portion of the cutting blade is flush with or below the plane of the bed, as represented by mount 124b. As can be appreciated, the mount can be articulated about and between the first position and the second positions. FIG. 5 further illustrates the exemplary substantially vertical movement of a mount 124 within a respective housing 120. As can be appreciated, in other aspects, the housing itself can be articulated in a substantially vertical direction that is substantially perpendicular to the plane of the bed. As discussed above, by articulating the mount, the depth of a cut made to the panel by the cutting blade can be varied. In one aspect in which the cross-section of the cutting blade is substantially arcuate, by articulating the mount in a substantially vertical direction, the width of the cut can also be varied.

In one aspect, the vertical distance through which the mount can be articulated can vary, and can also depend on the height of the respective cutting blade. In one aspect, the mount can be articulated through a distance of about 0.1 mm to about 15 mm. Optionally, the distance can range from about 0.1 mm to about 7.5 mm. In another aspect, the distance can range from about 0.1 mm to about 3 mm, including 0.25 mm, 0.5 mm, 0.75 mm, 1 mm, 1.25 mm, 1.5 mm, 1.75 mm, 2 mm, 2.25 mm, 2.5 mm, 2.75 mm, and 3 mm.

It is contemplated that, in one aspect, the mounts (and/or housings) can be articulated by one or more drive cams 140 operably coupled to the mounts and driven by one or more drive shafts 142, as shown in FIG. 4. In another aspect, a mount can be articulated by at least one hydraulic cylinder or pneumatic cylinder operably coupled to the mount. Optionally, a mount can be articulated by at least one motor operably coupled to the mount. As can be appreciated, in various aspects, the mounts (and/or housings) can be articulated individually. For example, in one aspect, a bed can define two or more openings, each having at least one mount operably positioned therein. In this aspect, each mount can be operably coupled to a respective articulating means (e.g., mechanical means, hydraulic means, pneumatic means, electro-mechanical means, etc.) such that each mount can be articulated independently of the other mounts. In another aspect, a processor can be used to control the articulating means, and thus to control the movement of the at least one mount and/or housing. In this aspect, the processor can be configured to generate a random movement pattern of the at least one cutting blade to create a series of randomly positioned cuts in a panel. In a further aspect, as described above, each mount can be articulated simultaneously in more than one direction.

Figure 7:
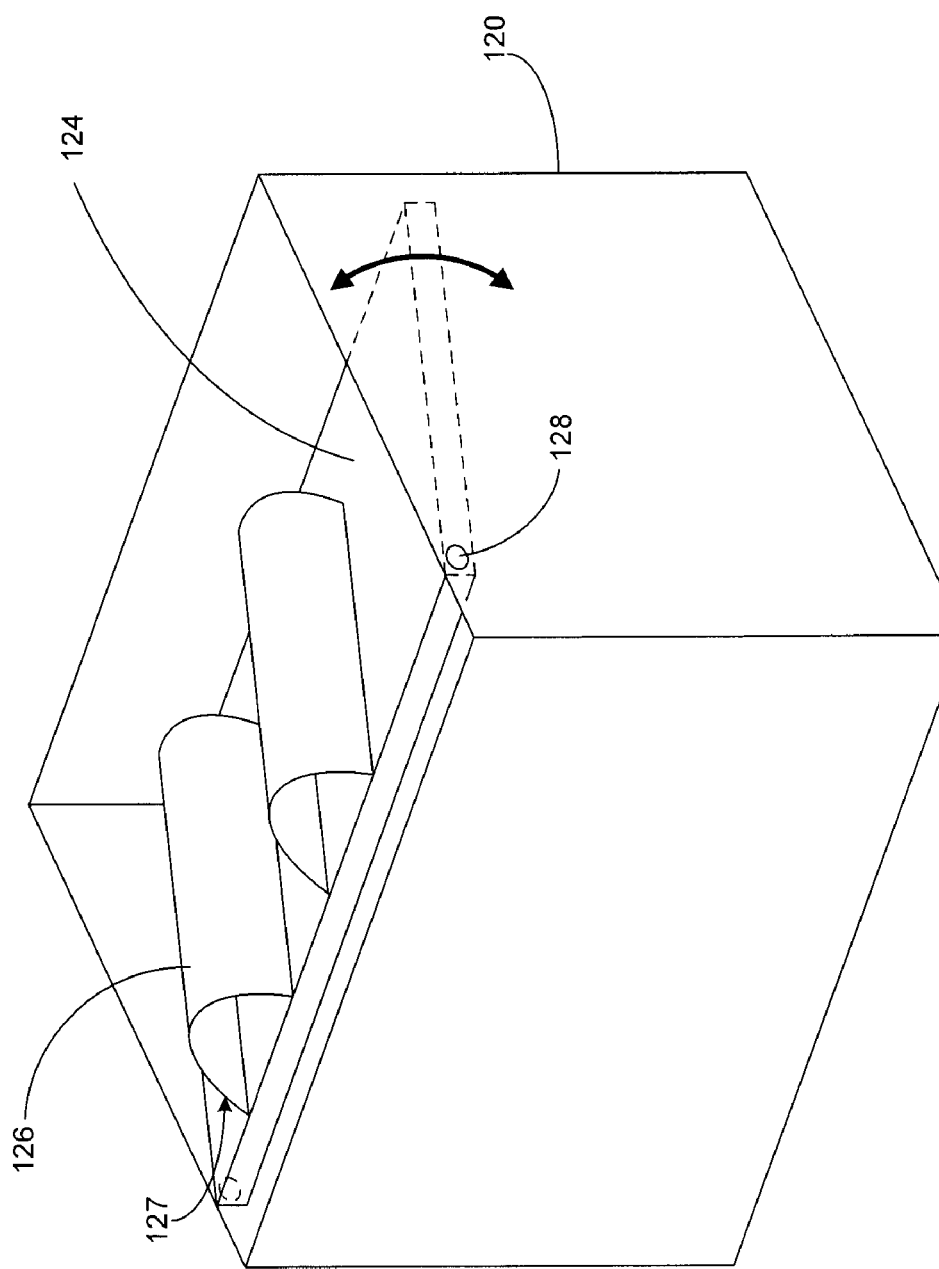
FIG. 7 is a schematic diagram illustrating a housing and movement of a mount within the housing, according to yet another aspect.

In one aspect, the texturing apparatus comprises means for pivoting a mount about an axis transverse to the machine direction and parallel to the plane of the bed. For example, FIG. 6 illustrates several possible positions to which a mount can be pivoted about a pivot 128. For example, the mount can be pivoted to a first position at which the cutting edge 127 of a cutting blade extends beyond the plane of the bed at a maximum height, as represented by mount 124*d*. The mount can also be articulated to a second position at which the cutting edge of the cutting blade is less than the maximum height, as represented by mount 124*f*. In one aspect, the second position can be a position at which the cutting edge of the cutting blade is flush with or below the plane of the bed (i.e., the cutting edge does not extend beyond the plane of the bed), as represented by mount 124*e*. As can be appreciated, the mount can be pivoted about and between the first position and the second position. FIG. 7 illustrates an exemplary pivoting movement of a mount 124 within a respective housing 120. As can be appreciated, the pivot can be mounted proximate a side of the housing, such as shown in FIG. 7, or can be positioned substantially toward the center of the housing. In one aspect, the mount is pivotable through an acute angle relative to the plane of the bed, as represented by the arrow of FIG. 7. As discussed above with regard to articulating the mount in a substantially vertical direction, by pivoting the mount, the depth of the cut can be varied.

Figure 9:
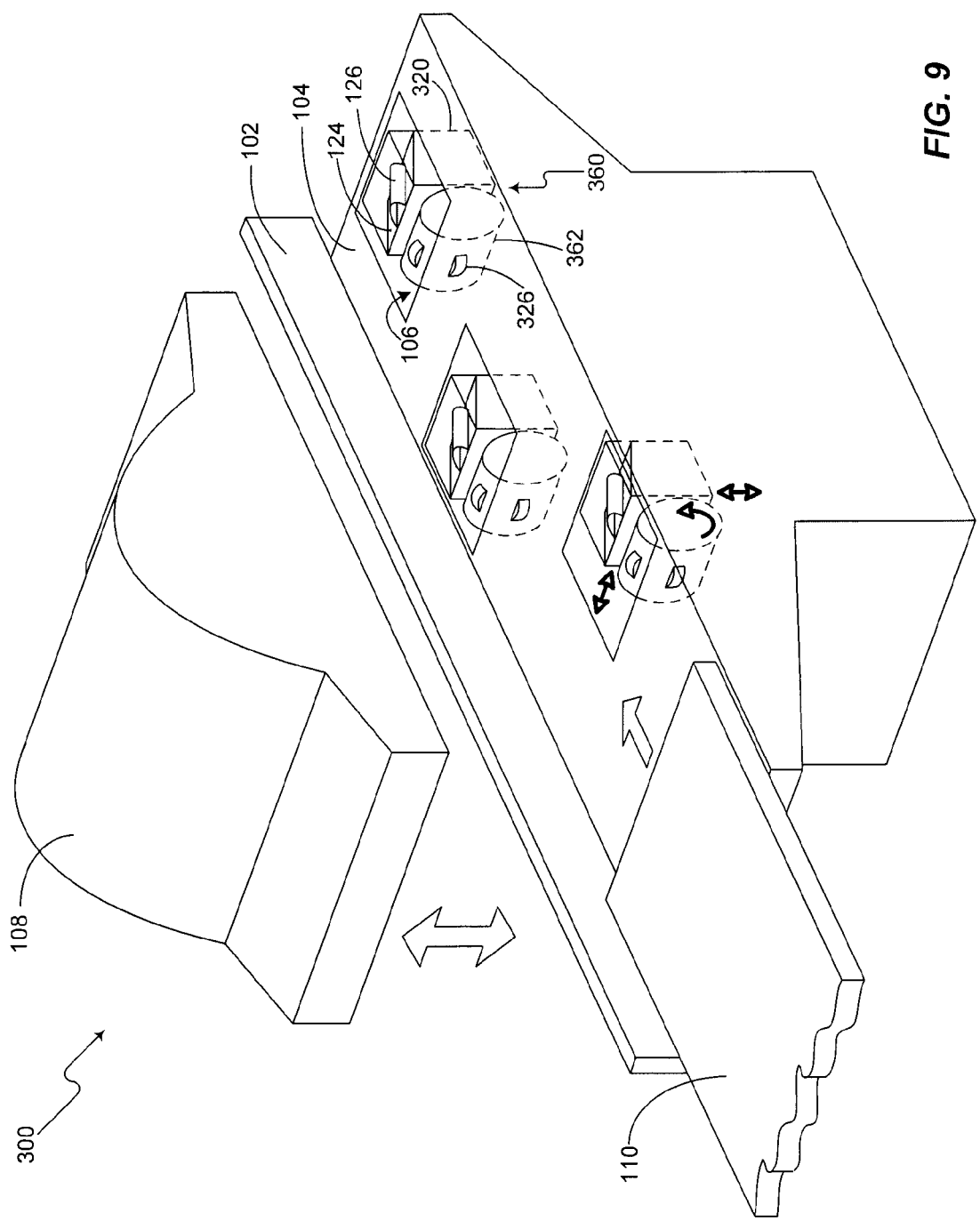
FIG. 9 is a schematic diagram illustrating a texturing apparatus for forming a textured surface on a panel, according to yet another aspect.

According to yet another aspect of the present invention, a texturing apparatus 300 is provided that comprises at least one cutting assembly 360, as illustrated in FIG. 9. In one aspect, the at least one cutting assembly 360 comprises a roller cutter 362 having at least one respective cutting blade 326, and a mount 124 having at least one respective cutting blade 126. In one aspect, the mount can be mounted and articulated such as described above. In another aspect, the mount can be mounted within a respective housing 320, also such as described above. The roller cutter 362 can have one or more cutting blades 326 positioned around a circumferential surface of the roller cutter, such as shown in FIG. 9. In one aspect, the roller cutter has between two and five cutting blades positioned around its circumference. According to a particular aspect, three cutting blades are provided around the circumference of the roller cutter, and substantially equally spaced from each other along the circumference. In another aspect, the roller cutter can rotate about an axis substantially transverse to the machine direction and substantially parallel to the plane of the bed. In still another aspect, the roller cutter can be operably coupled to the mount, and thus, can move in coordination with the articulation of the respective mount.

At least one opening 106 can be defined within the planar bed 104, and at least one cutting assembly 360 can be positioned therein each opening. A cutting assembly can be placed therein an opening such that the roller cutter 362 faces the machine direction, with the housing 320 positioned behind the roller cutter in the machine direction (i.e., the plurality of roller cutting blade are positioned upstream of the at least one cutting blade 126 of the respective mount). In one aspect, the roller cutter is positioned longitudinally in front of the housing such that the roller cutter cutting blade(s) 326 are longitudinally aligned with the cutting blade 126 of the mount. According to a further aspect, the height of the roller cutter cutting blades relative to the plane of the bed is less than the respective height of the mount cutting blade 126 with respect to the plane of the bed.

As the panel travels in the machine direction, at least one of the roller cutter cutting blade(s) 326 can contact the panel 110 to create an initial cut, such as in the top structural layer of the panel. As may be appreciated, the roller cutter can be configured to rotate toward the machine direction, as indicated by the curved arrow in FIG. 9. The mount cutting blade 126 can then contact the panel and create a second cut, substantially along the same path as the initial cut. As may be appreciated, if the height of the mount cutting blade is greater than the height of the roller cutter cutting blade, the second cut made by the mount cutting blade will deepen the initial cut. Thus, it is contemplated that the roller cutter cutting blade 326 and the mount cutting blade can be positioned substantially in a common plane substantially parallel to the machine direction and can cooperate to create a single cut in the panel.

As shown in FIG. 9, according to various aspects, a plurality of openings 106 can be defined therein the planar bed in an offset or staggered manner. The openings can have a transverse dimension that is substantially equal to the width of the bed, or can have a transverse dimension that is less than the width of the bed, as shown in FIG. 9. At least one cutting assembly 360 can be positioned therein each opening. The cutting assembly can be moved within each opening in a second direction that is substantially transverse to the machine direction and substantially parallel to the plane of the bed, such as indicated by the transverse arrow of FIG. 9. The cutting assembly can also be moved within each opening in a first direction that is substantially vertical and substantially perpendicular to the plane of the bed. Thus, as described above, the cutting assembly can be moved downward in the first direction such that the roller cutter cutting blade(s) 326 and mount cutting blade 126 lie below the plane of the planar bed. As the panel passes over the opening in which such a cutting assembly is positioned, it is contemplated that the panel will pass over the opening without being cut by the respective cutting blades. It is further contemplated that, by adjusting the position of the cutting assembly in the first direction, the depth of the cut in the panel formed by the respective cutting assembly can be selected or controlled.

In one aspect, the roller cutter 362 and housing 320 can be mechanically or electro-mechanically coupled to each other such that the entire cutting assembly 360 moves in the first and/or second directions as desired. In a further aspect, each cutting assembly can be moved independently from one another in the first and/or second directions. Optionally, the roller cutter and housing 320 of each cutting assembly can be configured to move in the first and/or second directions independently. For example, the roller cutter 362 and mount 124 can each be operatively coupled to respective articulating means, such as hydraulic or pneumatic cylinders, motors, etc. As may be appreciated, a processor can be used to control the articulating means, and thus to control the movement of the at least one cutting assembly or the individual roller cutter(s) and housing(s). The processor can be configured to generate a random movement pattern of the cutting assemblies to create a series of randomly positioned cuts in a panel.

Figure 10:
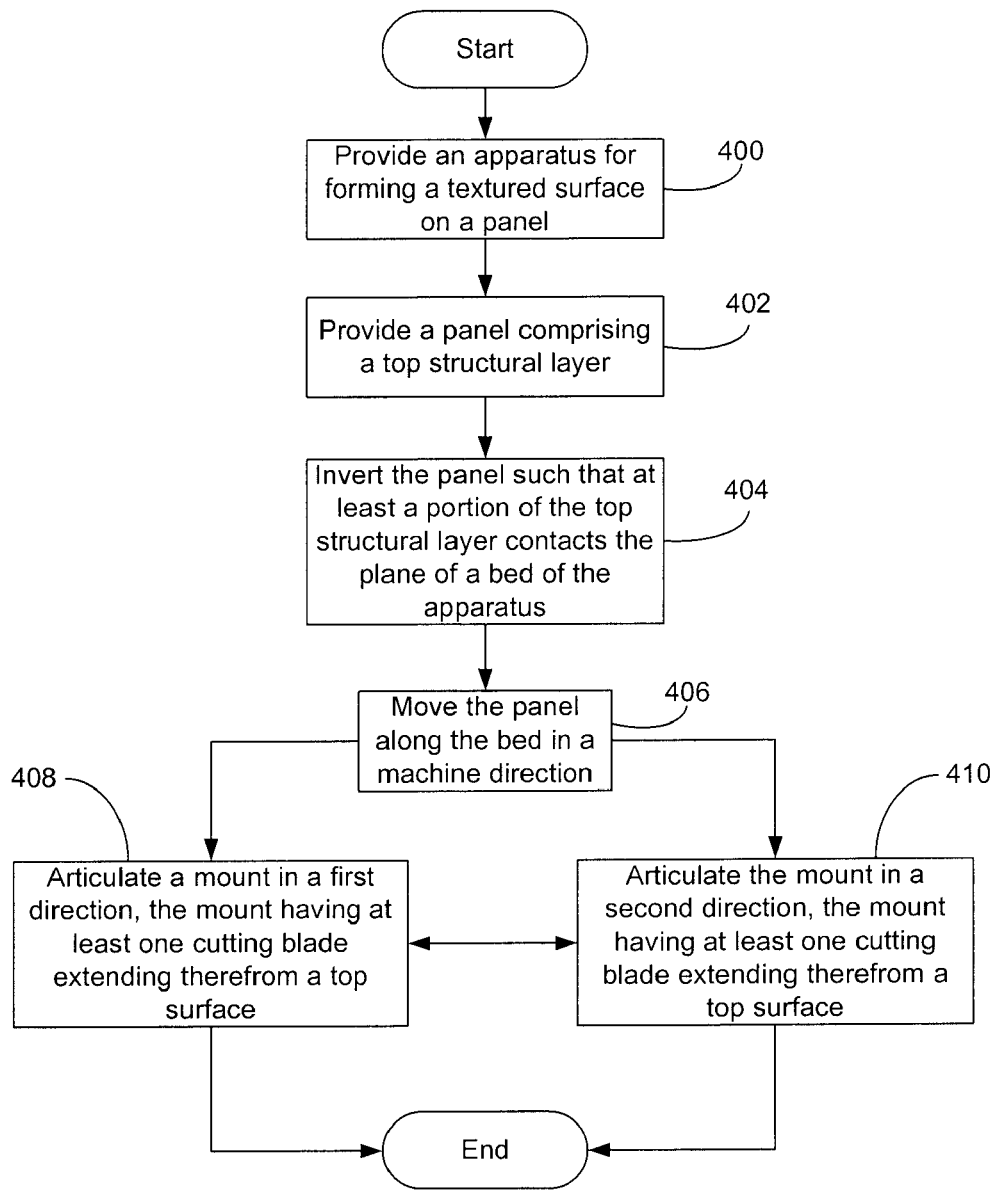
FIG. 10 is a flow-chart illustrating steps of a method for forming a textured surface on a panel, according to one aspect.

In use, the texturing apparatus according to various aspects (such as, but not limited to, the exemplary aspects of the texturing apparatuses as described above), can be used to form a textured surface on a panel. With reference to FIG. 10, at step 400, a texturing apparatus can be provided comprising a bed that defines three openings, such as shown in FIG. 1. Each of three mounts 124 can be operably positioned therein a respective opening 106. The mounts can comprise at least one cutting blade 126 fixedly mounted thereon a top surface of the mount and extending outwardly from the top surface. It is contemplated that the texturing apparatus comprises a bed that defines any number of openings, mounts, and cutting blades that can be used to form a textured surface on a panel, and aspects of the present invention are not intended to be limited to the particular texturing apparatus described in the following description.

At step 402, a panel 110 can be provided. The panel can comprise a top structural layer. The panel can also comprise wood or other material. At step 404, the panel is inverted such that at least a portion of the top structural layer contacts the plane of the bed 104. The panel can be moved along the bed in a machine direction at step 406. As described above, the panel can be moved automatically, manually, or a combination thereof. As the panel moves along the bed in the machine direction, it is contemplated that at least a portion of the panel will be moved across at least a portion of one or more openings. The mounts can be articulated in one or more directions as the panel is moved along the machine direction.

For example, at step 408, one or more mounts can be articulated in a second direction that is substantially transverse to the machine direction and substantially parallel to the plane of the bed. Similarly, at step 410, the one or more mounts can be articulated in a first direction that is substantially vertical and substantially perpendicular to the plane of the bed. The mounts can be articulated in either or both of the first and second directions simultaneously with the movement of the panel along the bed. As can be appreciated, the articulation of one or more mounts simultaneously with the movement of the panel along the bed can be used to cut though a thickness of the panel, forming various cuts in the panel. For example, articulation of a mount in the second direction while a panel is moving in the machine direction along the bed can create a diagonal cut in the panel. Optionally, the articulation of the mounts can be started and stopped as the panel is moved along the bed. The articulation can be controlled manually, automatically, or by a combination thereof. As discussed above, in one aspect, each mount can be controlled by independent articulating means. For example, one mount can be articulated in the second direction as the panel moves along the bed, while another mount can be held in a fixed position.

As can be appreciated, as the panel moves along the bed in the machine direction, at least a portion of the top structural layer can be contacted by one or more cutting blades mounted on one or more mounts. In one aspect, the cutting blades are configured to form a cut in at least a portion of the top structural layer. By articulating the mounts in various directions, the depth, shape and/or position of the cuts can be manipulated. For example, to impart a deeper cut, a mount can be articulated upwardly in the first direction. To make a shallower cut, the mount can be articulated downwardly in the first direction. Similarly, the position of the cuts on the top structural layer of the panel can be manipulated by articulating the mounts in the second direction. As described above, the articulation of the mounts can be controlled automatically, manually, or both. Thus, the cuts formed in the panel can be formed in a predetermined pattern, in a random pattern, etc. For instance, if the texturing apparatus is automatically controlled by a computing device, such as, for example, a processor, software can be provided for randomizing the articulation of the mounts such that each panel that is textured by the texturing apparatus will have a substantially unique appearance.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A texturing apparatus for forming a textured surface on a panel, comprising:
   a planar bed configured to receive the panel and configured to allow movement of the panel in a machine direction, the bed defining a plurality of openings arranged in an array;
   a plurality of mounts each having a respective top surface, wherein at least one of the plurality of mounts is positioned therein each of the plurality of openings;
   a plurality of cutting blades, wherein one cutting blade of the plurality of cutting blades is fixedly mounted to each of the plurality of mounts, wherein at least a portion of each of the plurality of cutting blades extends outwardly from the top surface of the respective mount, wherein the at least one cutting blade has a distal end and a proximal end, and wherein at least a portion of the distal end of the at least one cutting blade comprises a cutting edge facing only the machine direction; and
   means for individually moving each of the plurality of mounts within each of the respective openings relative to the other mounts of the plurality of mounts.

2. The texturing apparatus of claim 1, wherein the means for individually moving each of the plurality of mounts comprises a drive cam operably coupled to at least one mount of the plurality of mounts.

3. The texturing apparatus of claim 1, wherein the means for individually moving each of the plurality of mounts comprises at least one pneumatic cylinder operably coupled to at least one mount of the plurality of mounts.

4. The texturing apparatus of claim 1, wherein the means for individually moving each of the plurality of mounts comprises at least one hydraulic cylinder operably coupled to at least one mount of the plurality of mounts.

5. The texturing apparatus of claim 1, wherein the means for individually moving each of the plurality of mounts comprises at least one motor operably coupled to at least one mount of the plurality of mounts.

6. The texturing apparatus of claim 1, wherein the means for individually moving each of the plurality of mounts comprises moving at least one mount of the plurality of mounts within at least one opening of the plurality of openings relative to a first axis substantially transverse to the machine direction and substantially transverse to the plane of the bed.

7. The texturing apparatus of claim 6, wherein the means for individually moving each of the plurality of mounts further comprises moving at least one mount of the plurality of mounts about and between a first position at which at least a portion of the cutting edge of the at least one cutting blade extends above the plane of the bed to a maximum height, and a second position at which the cutting edge of the at least one cutting blade is positioned less than the maximum height.

8. The texturing apparatus of claim 7, wherein, in the second position, the cutting edge of the at least one cutting blade is positioned at or below the plane of the bed.

9. The texturing apparatus of claim 6, wherein the means for individually moving each of the plurality of mounts further comprises axially articulating the at least one mount of the plurality of mounts within the at least one opening of the plurality of openings relative to a second axis substantially transverse to the machine direction and substantially transverse to the first axis.

10. The texturing apparatus of claim 9, wherein the at least one mount is selectively moved relative to the first axis and the second axis.

11. The texturing apparatus of claim 10, wherein the at least one mount is selectively moved relative to the respective first and second axis substantially simultaneously.

12. The texturing apparatus of claim 9, wherein the means for individually moving each of the plurality of mounts further comprises moving the at least one mount about and between a first position at which at least a portion of the cutting edge of the at least one cutting blade extends above the plane of the bed to a maximum height, and a second position at which the cutting edge of the at least one cutting blade is positioned at or below the plane of the bed.

13. The texturing apparatus of claim 12, wherein, prior to moving the at least one mount within the at least one opening along the second axis, the cutting edge of the at least one cutting blade is articulated to the second position.

14. The texturing apparatus of claim 1, wherein the plurality of mounts are selectively staggered in the machine direction.

15. The texturing apparatus of claim 1, wherein at least one opening of the plurality of openings extends substantially across an entire width of the plane of the bed.

16. The texturing apparatus of claim 1, wherein at least one opening of the plurality of openings has a width that is less than a width of the bed.

17. The texturing apparatus of claim 1, further comprising at least a first guide configured to guide the panel along the bed.

18. The texturing apparatus of claim 1, wherein at least one mount of the plurality of mounts is positioned within at least one housing, and wherein the at least one housing is operably positioned therein at least one opening of the plurality of openings.

19. The texturing apparatus of claim 1, wherein the at least one cutting blade has a nonlinear cross-section.

20. The texturing apparatus of claim 1, wherein the at least one cutting blade has an arcuate cross-section.

21. The texturing apparatus of claim 1, wherein the cutting edge defines an obtuse angle relative to the plane of the bed.

22. The texturing apparatus of claim 1, wherein the cutting edge defines a right angle relative to the plane of the bed.

23. The texturing apparatus of claim 1, wherein the cutting edge defines an acute angle relative to the plane of the bed.

24. The texturing apparatus of claim 1, further comprising a processor configured for controlling the means for individually moving each of the plurality of mounts.

25. The texturing apparatus of claim 24, wherein the processor is configured to generate a random movement pattern.

26. The texturing apparatus of claim 18, wherein the at least one housing is removably attached to the planar bed.

27. A texturing apparatus for forming a textured surface on a panel, comprising:
  a planar bed configured to receive the panel and configured to allow movement of the panel in a machine direction, the bed defining a plurality of openings arranged in an array;
  a plurality of mounts each having a respective planar top surface, wherein at least one of the plurality of mounts is positioned therein each of the plurality of openings;
  a plurality of cutting blades, wherein at least one of the plurality of cutting blades is fixedly mounted to the respective planar top surface of each of the plurality of mounts and wherein at least a portion of each of the plurality of cutting blades extends outwardly from the top surface of the respective mount; and
  means for individually moving each of the plurality of mounts within each of the respective openings relative to a first axis substantially transverse to the machine direction and substantially transverse to the plane of the bed and relative to a second axis substantially transverse to the machine direction and substantially transverse to the first axis.

28. The texturing apparatus of claim 27, wherein the means for individually moving each of the plurality of mounts comprises a drive cam operably coupled to at least one mount of the plurality of mounts.

29. The texturing apparatus of claim 27, wherein the means for individually moving each of the plurality of mounts comprises at least one pneumatic cylinder operably coupled to at least one mount of the plurality of mounts.

30. The texturing apparatus of claim 27, wherein the means for individually moving each of the plurality of mounts comprises at least one hydraulic cylinder operably coupled to at least one mount of the plurality of mounts.

31. The texturing apparatus of claim 27, wherein the means for individually moving each of the plurality of mounts comprises at least one motor operably coupled to at least one mount of the plurality of mounts.

32. The texturing apparatus of claim 27, wherein the means for individually moving each of the plurality of mounts further comprises moving at least one mount of the plurality of mounts about and between a first position at which at least a portion of the cutting edge of the at least one cutting blade extends above the plane of the bed to a maximum height, and a second position at which the cutting edge of the at least one cutting blade is positioned less than the maximum height.

33. The texturing apparatus of claim 32, wherein, in the second position, the cutting edge of the at least one cutting blade is positioned at or below the plane of the bed.

34. The texturing apparatus of claim 27, wherein the at least one mount is selectively movable relative to the first axis and the second axis.

35. The texturing apparatus of claim 34, wherein the at least one mount is selectively moved relative to the respective first and second axis substantially simultaneously.

36. The texturing apparatus of claim 27, wherein the means for individually moving each of the plurality of mounts further comprises moving the at least one mount about and between a first position at which at least a portion of the cutting edge of the at least one cutting blade extends above the plane of the bed to a maximum height, and a second position at which the cutting edge of the at least one cutting blade is positioned at or below the plane of the bed.

37. The texturing apparatus of claim 36, wherein, prior to moving the at least one mount within the at least one opening along the second axis, the cutting edge of the at least one cutting blade is articulated to the second position.

38. The texturing apparatus of claim 27, wherein the plurality of mounts are selectively staggered in the machine direction.

39. The texturing apparatus of claim 27, wherein at least one opening of the plurality of openings extends substantially across an entire width of the plane of the bed.

40. The texturing apparatus of claim 27, wherein at least one opening of the plurality of openings has a width that is less than a width of the bed.

41. The texturing apparatus of claim 27, further comprising at least a first guide configured to guide the panel along the bed.

42. The texturing apparatus of claim 27, wherein at least one mount of the plurality of mounts is positioned within at least one housing, and wherein the at least one housing is operably positioned therein at least one opening of the plurality of openings.

43. The texturing apparatus of claim 42, wherein the at least one housing is removably attached to the planar bed.

44. The texturing apparatus of claim 27, wherein the at least one cutting blade has a nonlinear cross-section.

45. The texturing apparatus of claim 27, wherein the at least one cutting blade has an arcuate cross-section.

46. The texturing apparatus of claim 27, wherein the cutting edge of the at least one cutting blade defines an obtuse angle relative to the plane of the bed.

47. The texturing apparatus of claim 27, wherein the cutting edge of the at least one cutting blade defines a right angle relative to the plane of the bed.

48. The texturing apparatus of claim 27, wherein the cutting edge of the at least one cutting blade defines an acute angle relative to the plane of the bed.

49. The texturing apparatus of claim 27, further comprising a processor configured for controlling the means for individually moving each of the plurality of mounts.

50. The texturing apparatus of claim 49, wherein the processor is configured to generate a random movement pattern.

* * * * *